March 21, 1950     D. E. MacLEOD     2,501,398
ANTIGLARE SHIELD
Filed Jan. 8, 1948
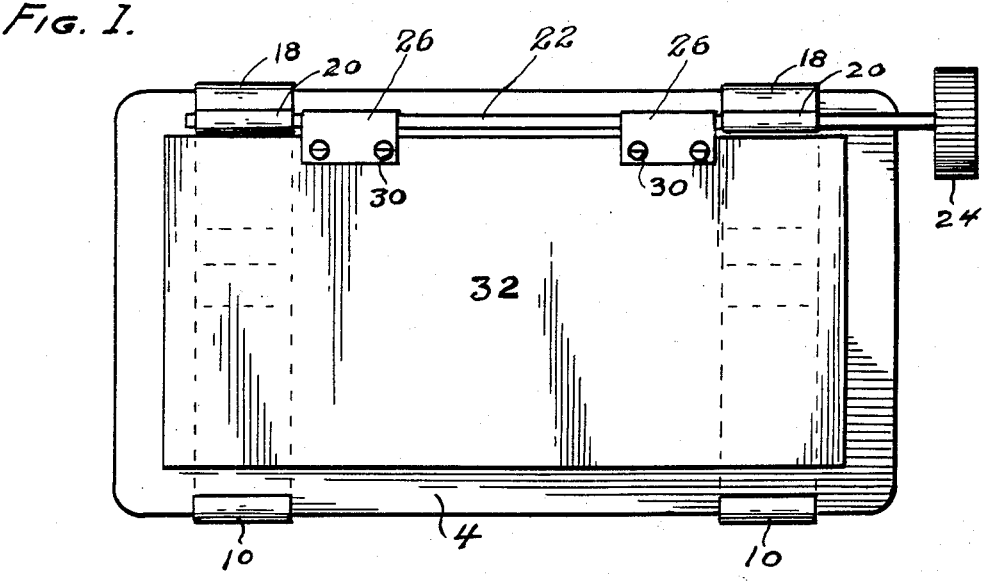
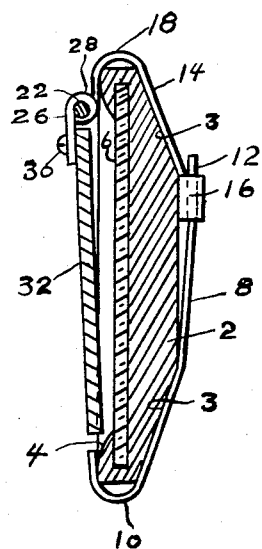
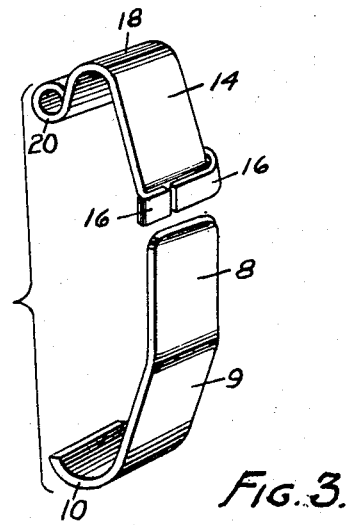
DAVID EARLE MacLEOD
INVENTOR.
BY Chas. K. Davies + Son
ATTORNEYS Patented Mar. 21, 1950

2,501,398

UNITED STATES PATENT OFFICE 2,501,398

ANTIGLARE SHIELD

David Earle MacLeod, Syracuse, N. Y.

Application January 8, 1948, Serial No. 1,246

1 Claim. (Cl. 88—77)

My present invention relates to an improved anti-glare shield for use with the conventional rear view mirror provided in an automobile and especially adapted for use at night to be lowered over the face of the mirror, to prevent the rays of light, from vehicles following in the rear of the automobile, and which pass through the rear window of the automobile, from being reflected into the eyes of the driver of the automobile. The shield according to my invention will be opaque and non-reflecting and will effectively absorb the light rays striking the surface.

The shield is so arranged and supported on the mirror that it may be swung up or down easily and for daylight driving will be moved to upward position and will not obscure the mirror so that the mirror may be used in the usual manner.

In the accompanying drawings I have illustrated one complete example of the physical embodiment of my invention according to the best mode I have thus far devised, but it will be understood that various changes and alterations may be made in the exemplified structure within the scope of the appended claim.

In the drawings—

Fig. 1 is a front elevational view of the shield of my invention mounted upon a rear view mirror and lowered as for night driving.

Fig. 2 is a vertical sectional view thereof.

Fig. 3 is a view in perspective of the clamp elements employed to adjustably attach the shield to the mirror.

Referring now to the drawings wherein I have illustrated the present preferred embodiment of my invention I employ the backing 2 having its rear face curved, beveled, or straight, as at 3 and formed with a peripheral rib 4 on the front face to receive and secure the conventional mirror 6 here shown as rectangular in area.

I utilize a pair of relatively stiff and shaped clamps of metal strips, the lower portion 8 of the clamp having an offset or angular portion 9 formed with a lower curved end creating a hook 10 to embrace the lower edge of the mirror backing.

The upper portion 12 of the lower clamp section 8 is designed for frictional engagement with the upper clamp section 14 which has its lower end extensions 16 bent inwardly over the body of the section 14 to snugly engage the inserted tongue end 12 and to detachably secure the tongue end. The upper end of the upper clamp section is curved at 18 to embrace the upper edge of the mirror backing, and the extreme portion of the section is curled at 20 to form a cylindrical journal for the shaft 22. A knurled knob 24 rigid with the end of the shaft provides manual means for rotating the shaft in its journals.

I also employ a pair of brackets 26 having curled ends 28 rigidly attached to the shaft 22, and the screws or rivets 30 secure the brackets to the shield 32 here shown as rectangular and of a size sufficient to cover the exposed portion of the mirror. The shield may be made of any suitable material opaque and non-reflecting, and having sufficient stiffness to retain its plane area when raised or lowered.

By the use of the clamp members described above the device may be mounted on mirrors of various sizes and shapes and the sections will securely engage the mirror when the tongue is pressed through the ends 16 and the angularity of the clamp sections will increase the frictional engagement between the same.

The device of my invention when mounted and used as described will permit the use of the shield with a minimum of effort in attachment and operation and will provide an effective screen to prevent the light rays of vehicles following to the rear from being reflected into the eyes of the driver. Such rays are often dangerous and at best annoying to the driver and the easy elimination of one source of blinding rays will make night driving that much less dangerous.

The device of my invention is simple to manufacture, easy to install, and elementary to operate, and being adapted for use on various sizes and shapes of mirrors will have wide use.

Having thus fully described by invention, what I claim as new and desire to secure by Letters Patent is:

In combination with a rear view mirror having a beveled back, a glare shield for the mirror comprising, a pair of separable resilient clamp sections having hooked end portions engaging opposite edges of the mirror, each clamp section having an angular portion off-set to conform to the beveled mirror back, inwardly folded lateral extensions on one clamp section off-set from the off-set portion thereof forming a mouth to snugly receive and frictionally retain one end of the complementary clamp section adjacent the mirror back, the extreme end of one clamp portion being curled upon itself to form a tubular bearing, a shaft rotatably mounted in said tubular bearing, brackets secured to said shaft for rotation therewith, and a glare shield supported by said brackets.

DAVID EARLE MacLEOD.

(References on following page)

REFERENCES CITED

The following references are of record in the file of this patent:

UNITED STATES PATENTS

| Number | Name | Date |
|---|---|---|
| 440,999 | Frost | Nov. 18, 1890 |
| 554,808 | Weaver | Feb. 18, 1896 |
| 1,278,779 | Springer | Sept. 10, 1918 |
| 1,719,707 | Lansing | July 2, 1929 |
| 1,905,868 | Hein | Apr. 25, 1933 |
| 1,926,979 | Gifford | Sept. 12, 1933 |
| 1,994,648 | Hoile | Mar. 19, 1935 |
| 2,050,917 | Biggs et al. | Aug. 11, 1936 |
| 2,118,962 | Barron | May 31, 1938 |
| 2,165,771 | Vlasak | July 11, 1939 |
| 2,191,775 | Sanderson | Feb. 27, 1940 |